Jan. 4, 1949.  E. D. COLBURN  2,458,146
CONTROL MEANS FOR AIRCRAFT
Filed Jan. 22, 1946  2 Sheets-Sheet 1
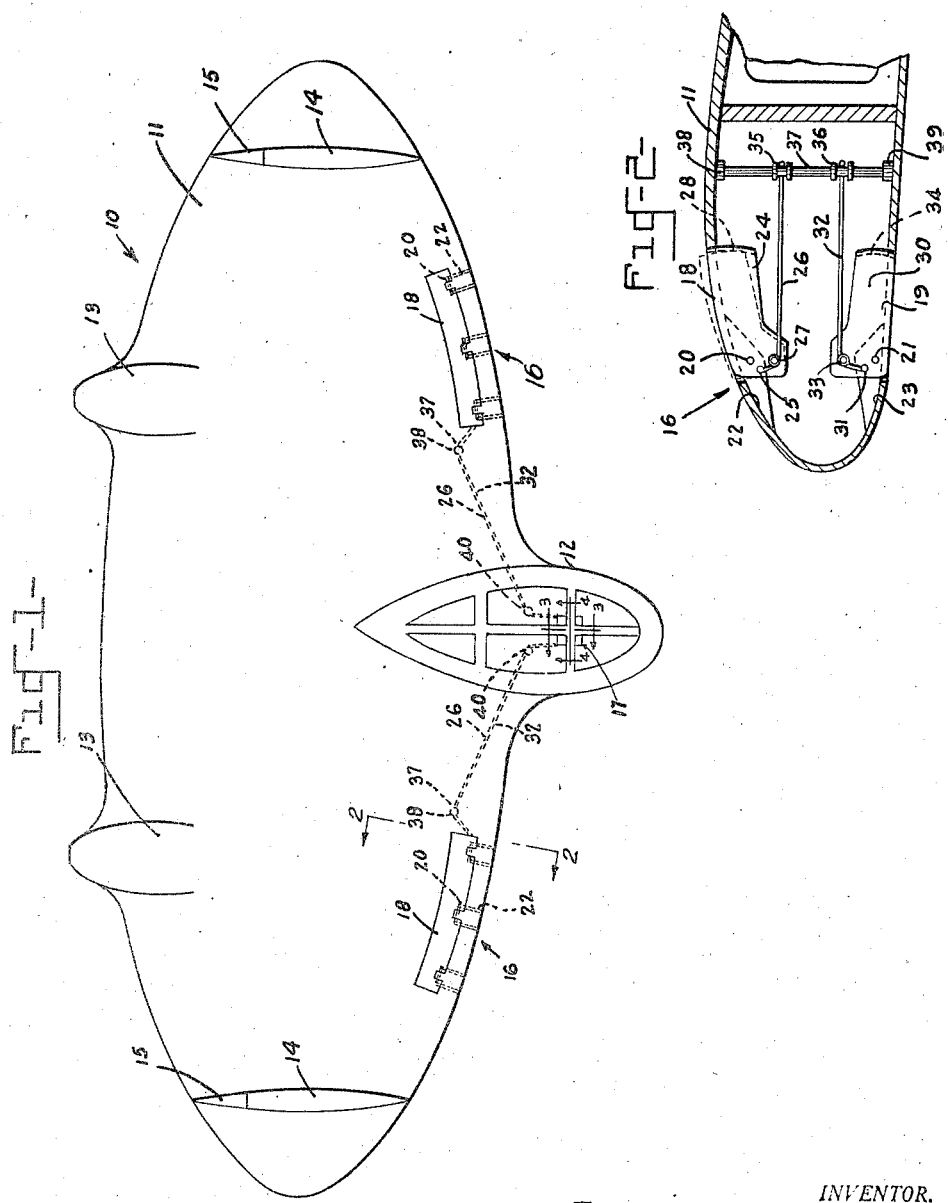
INVENTOR.
EDWARD DOUGLAS COLBURN
BY Jan. 4, 1949.  E. D. COLBURN  2,458,146
CONTROL MEANS FOR AIRCRAFT
Filed Jan. 22, 1946  2 Sheets-Sheet 2
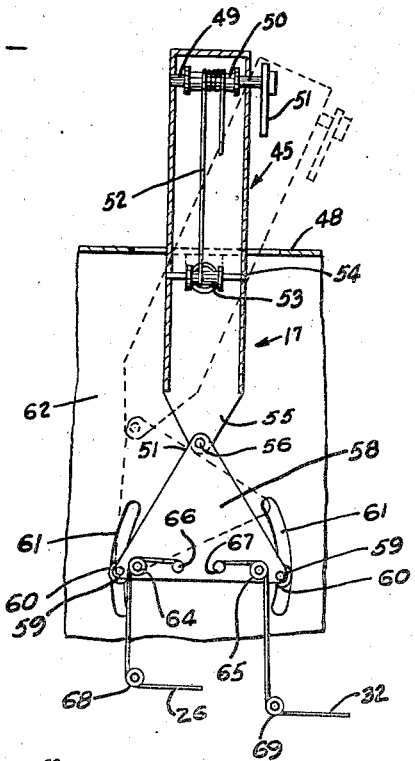
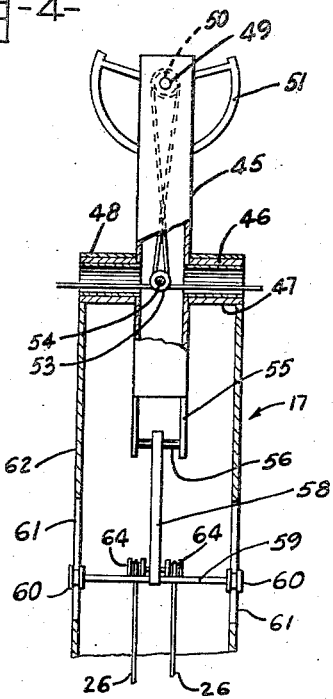
INVENTOR.
EDWARD DOUGLAS COLBURN
BY Patented Jan. 4, 1949

2,458,146

UNITED STATES PATENT OFFICE 2,458,146

CONTROL MEANS FOR AIRCRAFT

Edward D. Colburn, South Glens Falls, N. Y.

Application January 22, 1946, Serial No. 642,653

3 Claims. (Cl. 244—83)

This invention relates to control means for aircraft, and more particularly to an elevator control for aircraft of the flying wing type.

A primary object of this invention is the provision of an improved elevator and control means therefor particularly adapted for use with aircraft of the flying wing type.

An additional important object of the invention is the provision of an improved elevator control for aircraft of this character adapted to be positioned adjacent the leading edge of the wing, and adapted when in operative position, or level flight, to be substantially flush with both the upper and lower surfaces of such a wing.

An additional object of the invention is the provision of such an aircraft control comprised of two portions, separately operable, one portion of which is adapted to project above the upper edge of the leading edge of the wing to cause the aircraft to descend, and the other portion of which is adapted to project below the lower surface of the leading edge of the wing to cause the aircraft to ascend.

An additional object of the invention is the provision of means whereby the two portions above mentioned are adapted to be operated individually and separately, the control means being so arranged that only one of the devices may be moved from its relatively flush position with respect to the wing at a time.

A further object of the invention is the provision of improved control means operable by a control column for operating such control surfaces.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a top plan view of one form of flying wing type aircraft embodying the control device of the instant invention, certain concealed portions thereof being indicated by dotted lines.

Figure 2 is an enlarged fragmentary sectional view taken substantially along the line 2—2 of Figure 1 and disclosing details of the operating mechanism for the control surfaces.

Figure 3 is an enlarged sectional view taken substantially along the line 3—3 of Figure 1 as viewed in the direction indicated by the arrows, showing the control column and certain associated mechanism.

Figure 4 is an enlarged sectional view taken substantially along the line 4—4 of Figure 1 and viewed in the direction indicated by the arrows, comprising a view substantially at right angles to Figure 3.

Similar reference characters refer to similar parts throughout the several views of the drawings.

Having reference now to the drawings, and more particularly to Figure 1, there is generally indicated at 10 a flying wing type aircraft including a wing surface 11, provided with a cockpit of nacelle 12, motor nacelles 13, vertical stabilizers 14, and rudders 15.

Elevators, comprising a feature of the instant invention, are generally indicated at 16, it being noted that such elevators are positioned adjacent the leading edge of the wing 11, and at a substantially midpoint thereof, and a control column adapted for the control of the elevators 16 is generally indicated at 17 positioned within the nacelle 12.

Referring now to the elevator 16 in detail, it will be seen that each elevator is comprised of upper and lower members 18 and 19 respectively, the outer surfaces of which are faired to fit flush with the adjacent surface of the wing. Each of the members 18 and 19 is pivotally secured as by means of pivot pins 20 and 21 respectively, to lugs 22 and 23 formed in the interior of the wing 11. The end portion 24 of each of the elevators 18 is provided with a pin 25 to which is secured the extremity of a control cable 26, which passes about a pulley 27 also secured to the end surface 24, the arrangement being such that a pull on the control cable 26, acting on the pin 25 will lift the elevator 18 about the pivot 20 to raise the rear portion thereof above the level of the upper surface of the wing 11. It is to be noted that a baffle or closure member 28 is provided closing the entire rear surface of the elevator member 18 when the same is raised, in order to prevent air turbulence or eddies when the elevator is in operating position.

The lower elevators 19 are correspondingly provided on their end portions 30 with pins 31, to which are secured control cables 32, passing about pulleys 33 similar in position to the pulleys 27. The lower elevators 19 are similarly provided with rear baffles 34 to prevent air turbulence when in use.

It is to be noted that the control cables 26 and 32 extend about suitable pulleys 35 and 36 respectively, mounted for free rotation on a shaft or axle 37 journalled in suitable journals 38 and 39 in the upper and lower interior surfaces of the wing 11 respectively.

As best shown in Figure 1, it will be seen that the cables 26 and 32 extend from the pulleys 35 and 36 to similar pulley shafts diagrammatically indicated at 40, positioned within the nacelle 12 and thence to the control column 17.

Referring now particularly to Figures 3 and 4, and the control column 17, it will be seen that the latter is comprised of a tubular member 45, which may be either rectangular or cylindrical in cross section, and which includes, as best shown in Figure 4, a transversely extending cylindrical member 46, journaled for rotation in a sleeve 47, depending from the floor 48 of the cockpit. It will thus be seen that forward and backward pivotal movement of the control column 17 may be readily effected, for a purpose to be more fully pointed out hereinafter.

Positioned within the upper portion of the tubular member 45 is an axle 49, which carries a drum 50 and extends outwardly of the column and has secured thereto a control wheel 51. A control cable 52 surrounds the drum 50 and extends to a drum or pulley 53 mounted on an axle 54 journalled in the side of the tubular member 45 substantially axially of cylindrical member 46 and transverse thereof. From the drum 53 the control cable extends outwardly through the sleeve 46 in opposite directions and extends to the rudders 15, for controlling the same in a known manner.

The lower portion of the control column 17 terminates in oppositely disposed projecting portions 55 between the lower extremities of which extends a pin 56 which passes through a suitable aperture in the apex 57 of a triangular member 58.

The triangular member 58 is provided in the opposite extremities of its base with transversely extending rods or axles 59 terminating in bearings 60 adapted to travel in arcuate slots 61 formed in the side walls of a suitable housing 62, the bearings and slots serving as guides for the movement of the triangle, when the control column is tilted forwardly or backwardly in the manner previously described.

Pulleys 64 and 65 are mounted adjacent the extremities of the base of the triangular member 58, and positioned inwardly thereof also adjacent the base are pins 66 and 67 respectively. Suitably secured to the plane in any desired manner, and adjacent and below the pulleys 64 and 65 respectively, are additional pulleys 68 and 69. The control cables 26 extend about the pulleys 68 and 64 respectively and have their extremities secured to the pin 66, while the control cables 32 extend about the pulleys 69 and 65 respectively, and have their extremities secured to the pin 67.

From the foregoing it will now be seen that when the control column 17 is tilted backwardly or to the right as viewed in Figure 3, the triangular member 58 will be correspondingly tilted forwardly, in such manner that the pulleys 60 to the right of Figure 3, rise upwardly in the arcuate slot 61, which in turn exerts a pull on the control cable 32 which, as previously described, acting through the pulleys 40, 36 and 33 is operative to swing the lower elevators 19 outwardly on its pivot 21. Conversely, when the column is tilted forwardly an opposite action of the triangular member 58 will be effected to exert a pull on the cable 26, and actuate the upper elevator 18.

Thus, in operation, when the column is tilted rearwardly to the broken line position of Figure 3 the lower elevator 19 will be swung outwardly whereby to create a drag on the under surface of the wing 11 and also to raise the forward edge thereof. In like manner, when the column 17 is swung forwardly to raise the upper elevator 18 a drag will be created on the upper surface of the wing 11 whereby to force the leading edge downwardly and cause the plane to dive.

From the foregoing it will be seen that there is herein provided an improved control means for aircraft, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In an aircraft having independent upper and lower elevator members, means for independently moving each member into and out of an operative position, comprising a rigid support, a control column, means pivotally connecting said column intermediate its ends to said support, a triangular member, means pivotally connecting one corner of said triangular member to one end of said column, a pair of elongated flexible connectors, each being connected to one of the remaining corners of said triangular member and adapted to operatively connect the same to one of said members, means comprising separate slidable connections connecting said last named corners of said triangular member to said support whereby tilting said column in one direction is adapted to actuate one elevator member and tilting said column in an opposite direction is adapted to activate said other member.

2. In an aircraft having independent upper and lower elevator members, means for independently moving each member into and out of an operative position, comprising a rigid support, a control column, means pivotally connecting said column intermediate its ends to said support, a triangular member, means pivotally connecting one corner of said triangular member to one end of said column, a pair of elongated flexible connectors, each being connected to one of the remaining corners of said triangular member and adapted to operatively connect the same to one of said members, means comprising separate slidable connections connecting said last named corners of said triangular member to said support whereby tilting said column in one direction is adapted to actuate one elevator member and tilting said column in an opposite direction is adapted to activate said other member, said slidable connections comprising a pair of spaced and opposed arcuate guideways in said support, antifriction means connecting each of said last-named corners of said triangular member to a separate guideway.

3. In an aircraft having independent upper and lower elevator members, means for independently moving each member into and out of an operative position, comprising a rigid support, a control column, means pivotally connecting said column intermediate its ends to said support, a triangular member, means pivotally connecting one corner of said triangular member to one end of said column, a pair of elongated flexible connectors, each being connected to one of the remaining corners of said triangular member and adapted to operatively connect the same to one of said members, means comprising separate slidable connections connecting said last named corners of said triangular member to said support whereby tilting said column in one direction is adapted to actuate one elevator member and tilting said column in an opposite direction is adapted to activate said other member, said support including a wall, said slidable connections, comprising a pair of spaced and opposed arcuate slots formed through said wall, a separate anti-friction roller operative in each of said slots, and means connecting each roller to one of said last named corners of said triangular member.

EDWARD D. COLBURN.

REFERENCES CITED

The following references are of record in the file of this patent:

UNITED STATES PATENTS

| Number | Name | Date |
| --- | --- | --- |
| 1,098,130 | Simpson | May 26, 1914 |
| 1,631,259 | Gilmore | June 7, 1927 |
| 1,830,429 | Elsby | Nov. 3, 1931 |
| 1,880,019 | Harper | Sept. 27, 1932 |
| 2,070,705 | Barnhart | Feb. 16, 1937 |
| 2,139,163 | Jones | Dec. 6, 1938 |
| 2,147,360 | Zaparka | Feb. 14, 1939 |
| 2,204,404 | Driggs | June 11, 1940 |